Figure 1:
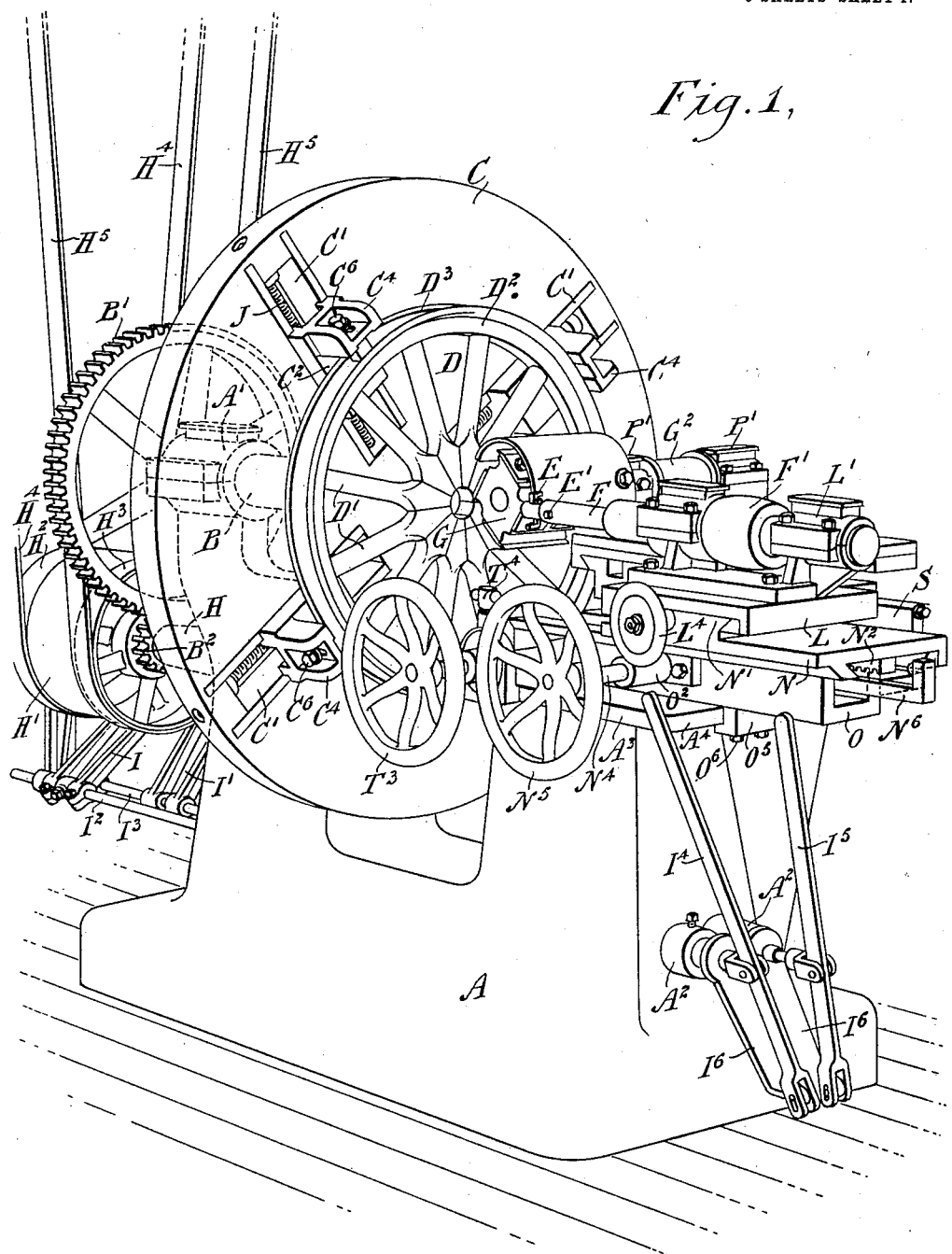

G. A. ENSIGN.
WHEEL BORING AND FACING MACHINE.
APPLICATION FILED MAR. 16, 1912.

1,039,503.

Patented Sept. 24, 1912.

5 SHEETS—SHEET 1.

WITNESSES
Edward Thorpe

INVENTOR
George A. Ensign
BY
ATTORNEYS

G. A. ENSIGN.
WHEEL BORING AND FACING MACHINE.
APPLICATION FILED MAR. 16, 1912.
1,039,503.
Patented Sept. 24, 1912.
5 SHEETS—SHEET 2.
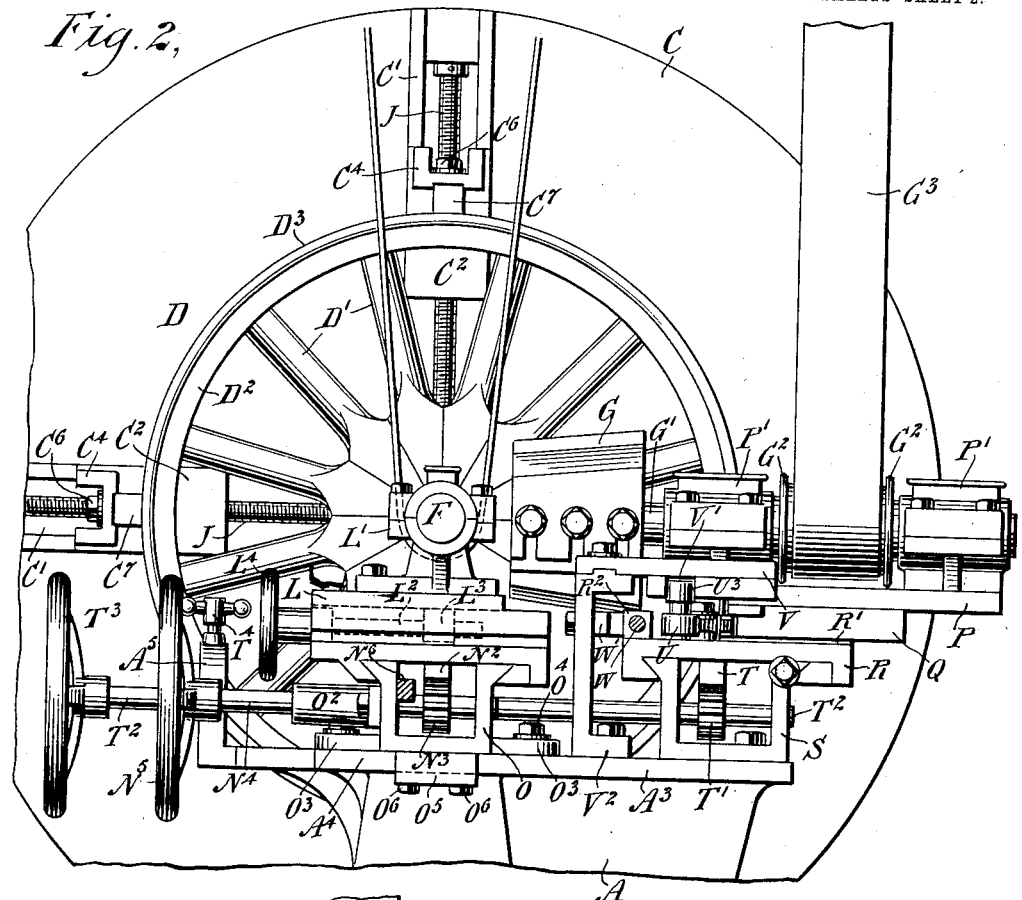
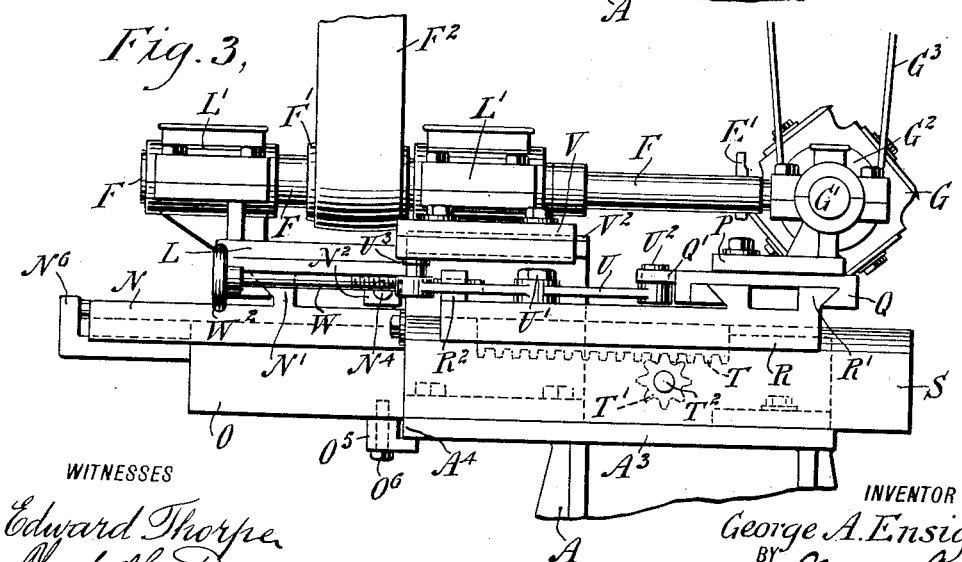
WITNESSES
Edward Thorpe
INVENTOR
George A. Ensign
BY
ATTORNEYS

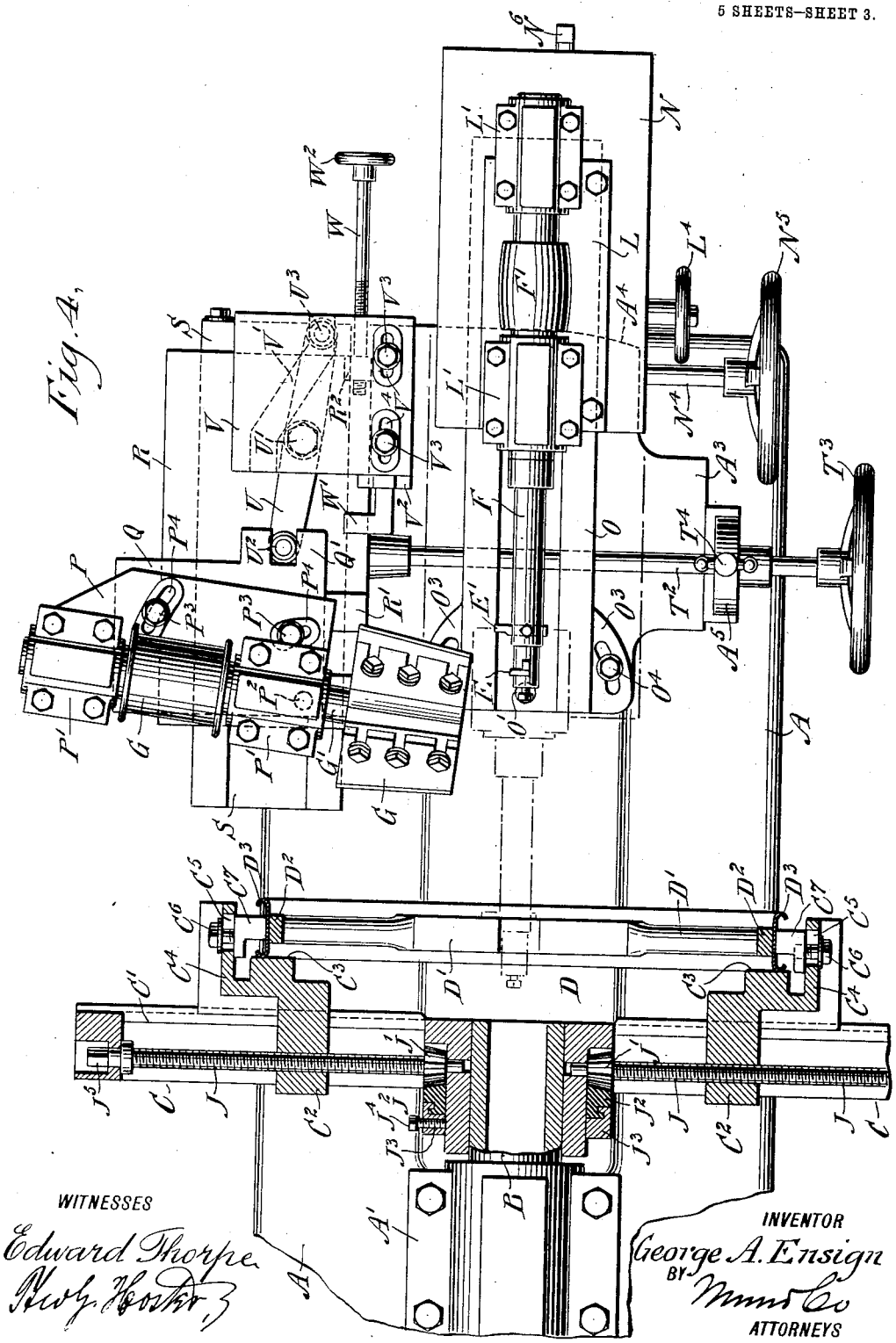

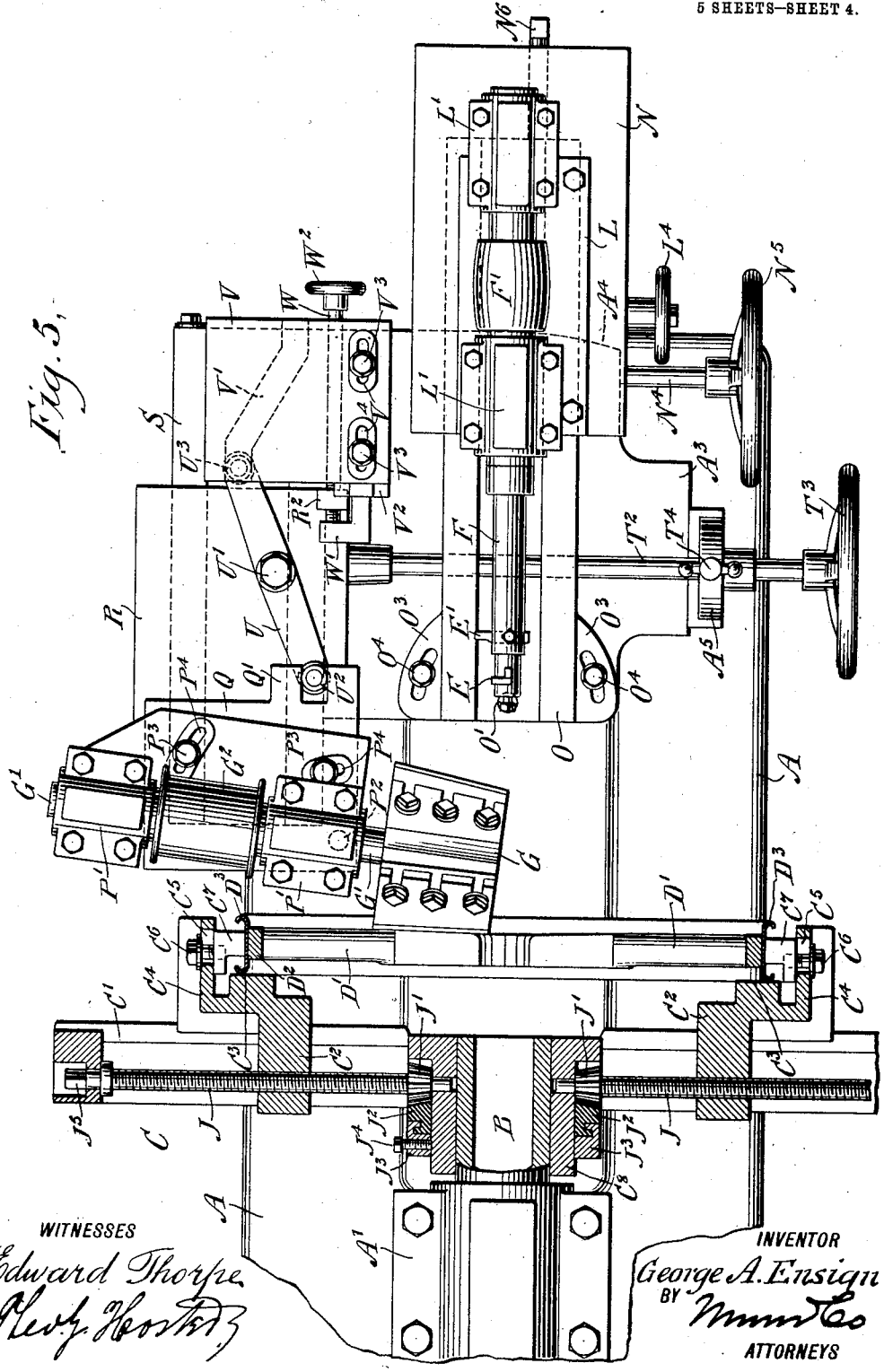

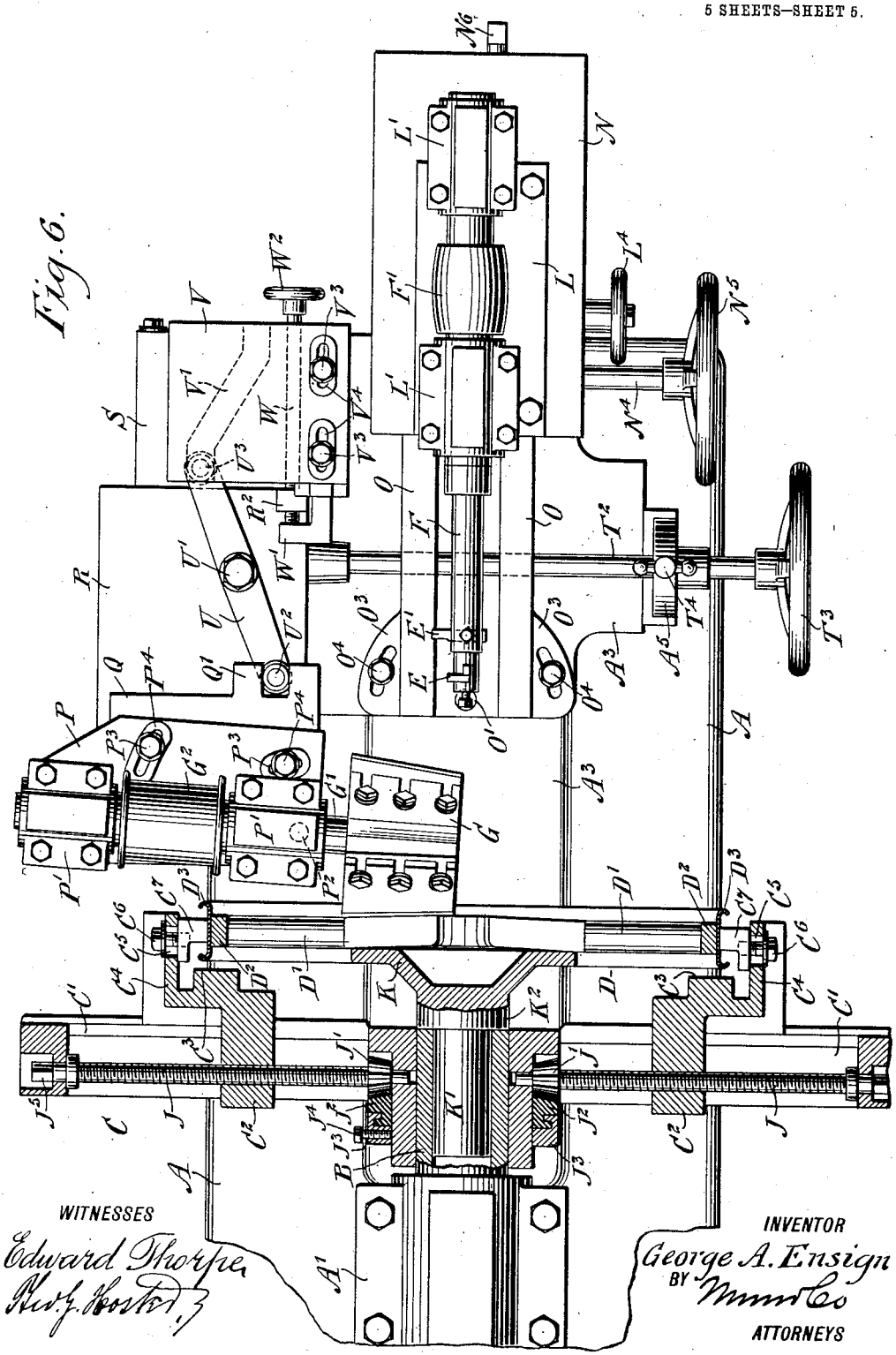

UNITED STATES PATENT OFFICE.

GEORGE A. ENSIGN, OF DEFIANCE, OHIO, ASSIGNOR TO DEFIANCE MACHINE WORKS, OF DEFIANCE, OHIO, A CORPORATION OF OHIO.

WHEEL BORING AND FACING MACHINE.

1,039,503. Specification of Letters Patent. Patented Sept. 24, 1912.

Application filed March 16, 1912. Serial No. 684,182.

*To all whom it may concern:*

Be it known that I, GEORGE A. ENSIGN, a citizen of the United States, and a resident of Defiance, in the county of Defiance and State of Ohio, have invented a new and Improved Wheel Boring and Facing Machine, of which the following is a full, clear, and exact description.

The invention relates to wood-working machines and its object is to provide a new and improved machine more especially designed for boring and facing automobile wheels and similar wheels in such a manner that the boring and facing is absolutely true relative to the wheel rim thus insuring the formation of a true wheel. For the purpose mentioned, use is made of a face plate for holding a wheel in place during the boring and facing operation, a retractable boring spindle having a boring tool for boring a cylindrical or conical hole centrally in the wheel, and a revoluble cutter head adapted to engage the face of the wheel and capable of bodily movement to permit of moving the cutter head into active position relative to the face of the wheel and into inactive position and out of the path of the boring spindle.

A practical embodiment of the invention is represented in the accompanying drawings forming a part of this specification, in which similar characters of reference indicate corresponding parts in all the views.

Figure 1 is a perspective view of the wheel boring and facing machine; Fig. 2 is an end view of the same; Fig. 3 is a rear side elevation of the same, the face plate and connected parts being omitted; Fig. 4 is a plan view of the wheel boring and facing machine, with the face plate shown in section and the parts in position for boring the wheel; Fig. 5 is a similar view of the same with the parts in position for facing one face of the wheel; and Fig. 6 is a like view of the same with the parts in position for facing the other face of the wheel.

The boring and facing machine is mounted on a suitably constructed frame A provided with a bearing A' in which is journaled a hollow spindle B carrying a main face plate C for supporting a wheel D to be first bored centrally by a boring tool E held on a retractable spindle F and to be subsequently faced on the central portion of both faces by a revoluble cutter head G, as hereinafter more fully explained. The wheel D shown in the drawings is an automobile wheel and consists of wooden spokes D', a felly $D^2$ and a metallic tire or rim $D^3$ shrunk or otherwise fastened on the felly $D^2$.

The face plate C is driven at a high speed (about 100 revolutions per minute) during the boring operation, and at a low speed (about 12 revolutions per minute), during the facing operation, and for this purpose the following arrangement is made: On the face plate spindle B is secured a gear wheel B' in mesh with a pinion $B^2$ secured on a main shaft H journaled on the frame A, and on the said shaft H is secured a fast pulley H' flanked at opposite sides by loose pulleys $H^2$, $H^3$ mounted to rotate loosely on the shaft H. Belts $H^4$, $H^5$ connect the loose pulleys $H^2$, $H^3$ with other machinery for imparting a traveling motion to the said belts $H^4$, $H^5$ at different speeds. The belts $H^4$, $H^5$ are engaged by belt shifters I, I' for moving either belt $H^4$ or $H^5$ from its loose pulley $H^2$ or $H^3$ onto the fast pulley H', to rotate the shaft H at a corresponding high or low speed and thus rotate the face plate C at a high or low speed owing to the gearing connecting the spindle B with the shaft H. The belt shifters I and I' are attached to longitudinally-extending shifter rods $I^2$, $I^3$, mounted to slide in suitable bearings $A^2$ arranged on the main frame A, and the right-hand ends of the said shifter rods $I^2$, $I^3$ are pivotally connected with levers $I^4$, $I^5$ fulcrumed on brackets $I^6$ attached to the bearings $A^2$. Normally the belts $H^4$, $H^5$ are in engagement with the loose pulleys $H^2$, $H^3$ and when it is desired to bore the wheel D then the operator manipulates the lever $I^4$ so as to shift the belt $H^4$ from the loose pulley $H^2$ onto the fast pulley H' to rotate the face plate C and with it the wheel D at a high rate of speed as previously mentioned, and when it is desired to face the wheel D by the cutter head G then the operator manipulates the lever $I^5$ so as to shift the belt $H^5$ from the loose pulley $H^3$ onto the fast pulley H' to rotate the face plate C and the wheel D at a low rate of speed. It is understood that after the boring operation is completed the lever $I^4$ is returned to normal position to move the belt $H^4$ from the fast pulley H' back onto the loose pulley H², and after the facing operation is completed the operator returns the lever I⁵ so as to shift the belt H⁵ from the fast pulley H' back onto the loose pulley H³, so that in either case the face plate C comes to a standstill after the boring and facing operations are completed.

The face plate C is provided with radially-disposed guideways C' on which are mounted to slide jaws C² each having a face C³ on which is adapted to rest one side of the rim D³ (see Figs. 4 and 5) during the time the wheel is bored and the outer face of the central portion faced by the cutter head G. Each jaw C² is provided at its outer end with a forwardly-projecting flange C⁴ having a slot C⁵ engaged by a bolt C⁶ held on a clamping block C⁷ adapted to engage the peripheral face of the rim D³ to hold the wheel D centrally in position on the face plate C. Each block C⁷ is longitudinally adjustable on the flange C⁴ to engage the rim D³ approximately midway of its width thus allowing the block C⁷ to clamp the wheel D in place at the time the rim D³ is seated on the faces C³ of the several jaws C² and also to allow of clamping the wheel D in position at the time the rim D³ is a distance away from the faces C³, as illustrated in Fig. 6, it being understood that at this time the other face of the wheel is faced by the cutter head G in the manner hereinafter more fully explained.

In order to simultaneously move the jaws C² inwardly or outwardly in their guideways C' for clamping the wheel D centrally in position on the face plate C, the following arrangement is made: Radially-disposed screw rods J are journaled on the face plate C at the guideways C', and the inner end of each screw rod J is provided with a bevel gear wheel J' in mesh with a bevel gear wheel J² mounted to rotate loosely on the hub C⁸ of the face plate C, and the said bevel gear wheel J² is journaled in a collar J³ fastened by a set screw J⁴ to the hub C⁸. The outer end J⁵ of each screw rod J is made polygonal for the application of a wrench or other suitable tool to permit of turning the screw rod J so that the gear wheel J² is rotated and consequently the several screw rods J are rotated in unison to cause the several jaws C² to move simultaneously inward or outward in the guideways C' according to the direction in which the screw rod J is turned at the time. Thus by the arrangement described the clamping blocks C⁷ can be readily moved in engagement with the peripheral face of the rim D³ to clamp the wheel D centrally in position on the face plate C, and the clamping blocks C⁷ can be readily moved out of engagement with the rim D³ whenever it is desired to remove the wheel D from the face plate C.

After one face of the wheel D is faced by the cutter head G then the wheel is reversed to present the other face to the cutter head G and the previously faced portion of the wheel is now seated against an auxiliary face plate K provided with a stem K' adapted to be inserted in the hollow end of the spindle B, as plainly shown in Fig. 6, the said face plate having a collar K² adapted to be seated on the end of the spindle B so as to hold the face plate K in proper position. The face of the face plate K extends in a vertical plane somewhat in advance of the plane in which the faces C³ of the jaws C² are located, and consequently the wheel D is now held out of engagement with the said faces C³ but is clamped in place by the block C⁷, the same as previously described and shown in Figs. 4 and 5. It will be noticed that by the use of the auxiliary face plate K the wheel D is held true according to the previously faced surface and irrespective of any irregularities that may exist in the rim D³, and consequently the wheel can now be faced on the other side by the cutter head G absolutely true with the portion previously faced, so that the facing of the wheel is absolutely true and the formation of a true wheel is insured.

It is understood that during the boring operation and the facing of the first side of the wheel, the auxiliary face plate K is not in use and is only placed in position after one side of the wheel D has been faced. The wheel is then reversed and placed in position against the face plate K and secured in place by the clamping blocks C⁷.

The boring spindle F is journaled in bearings L' arranged on a carriage or slide L mounted to slide transversely on a guideway N' of a slide or carriage N mounted to slide forward and backward on a guideway O pivotally connected at its forward end at O' to a table A³ of the main frame A. In order to move the slide L transversely on the guideway N' use is made of a screw rod L² journaled on the slide N and screwing in a nut L³ secured or formed on the under side of the slide L. The outer end of the screw rod L² is provided with a hand wheel L⁴ under the control of the operator for turning the screw rod L² so as to shift the slide L and with it the spindle F in a transverse direction so as to move the spindle into proper position to bore a hole of larger or smaller diameter by the use of the same boring tool E fastened to the forward end of the spindle F. The spindle F is provided in the rear of the boring tool E with a facing tool E' adapted to bevel or chamfer the front of the wheel at the hole bored by the boring tool E with a view to provide a smooth entrance to the hole and to prevent chipping by the action of the cutter head G. The spindle F is provided intermediate the bearings L' with a pulley F' connected by a belt F² with other machinery for rotating the spindle F while boring the hole in the wheel.

In order to advance or retract the spindle F the slide N is moved forward or backward, and for this purpose use is made of a rack N² secured to the under side of the slide N and in mesh with a gear wheel N³ secured on a shaft N⁴ journaled in suitable bearings O² attached to the guide way O, and the outer end of the shaft N⁴ is provided with a hand wheel N⁵ adapted to be turned by the operator to move the slide N and the parts supported thereby in a longitudinal direction, that is, to feed the boring spindle F forward with a view to cause the boring tool E to bore the hole in the wheel and to allow of retracting the boring spindle F on turning the hand wheel N⁵ in a reverse direction. The return movement of the slide N is limited by a stop N⁶ held on the slide O and adapted to be engaged by the outer end of the slide N. When boring cylindrical holes in the wheel the axis of the boring spindle F coincides or is parallel with the axis of the spindle B, but when it is desired to bore a conical hole in the wheel then the guide way O is swung on its pivot O' so as to move the boring spindle F into an angular position relative to the axis of the spindle B. For the purpose mentioned the guideway O is provided with slotted lugs O³ engaged by bolts O⁴ screwing in the table A³ so that when the bolts O⁴ are loosened the guideway O can be swung in a transverse direction on top of the table A³ to move the boring spindle F into either of the positions above mentioned, and when the desired position is reached the guideway O is fastened in the adjusted position by screwing up the bolts O⁴ so as to fasten the guideway O in position on top of the table A³. A clamping block O⁵ is fastened by bolts O⁶ to the under side of the slide O at the outer end thereof, and the said clamping block O⁵ is adapted to engage the outer rounded off edge A⁴ of the table A³ to aid in holding the slide O securely in place on the top of the table A³. It is understood that when it is desired to swing the slide O, the bolts O⁶ as well as the bolts O⁴ have to be loosened to permit shifting of the slide and after the latter has reached the desired position the bolts O⁴ and O⁶ are screwed up.

The cutter head G is mounted on a spindle G' journaled in suitable bearings P' arranged on a plate P mounted to slide on a pivot P² held on a carriage or slide Q and adapted to be fastened thereto after a desired adjustment has been made by bolts P³ screwing in the slide Q and engaging segmental slots P⁴ arranged on the plate P. On the spindle G' between the bearings P' is secured a pulley G² connected by a belt G³ with other machinery for imparting a rotary motion to the spindle G' and the cutter head G. The slide Q is mounted to slide on transverse guideways R' arranged on the top of a slide or carriage R mounted to slide on a longitudinal guideway S bolted or otherwise secured to the table A³ of the main frame A. On the under side of the slide R is secured a rack T (see Figs. 2 and 3) in mesh with a gear wheel T' secured on a transverse shaft T² provided with a hand wheel T³ under the control of the operator for turning the shaft T² so as to move the slide R and the parts supported thereby in a longitudinal direction by the action of the gear wheel T' on the rack T. The shaft T² is journaled at its rear end in bearings arranged on the guideway S and the forward end of the said shaft is journaled in a bearing A⁵ arranged on the table A³, and a set screw T⁴ screws in the said bearings A⁵ against the shaft T² so as to lock the same against turning during the time the cutter head G is not in use and is out of the path of the boring spindle F (see Fig. 4).

In order to impart a transverse sliding motion automatically to the slide Q from the slide R at the time the latter is moved forward or backward, the following arrangement is made: A lever U is fulcrumed at U' on the top of the slide R and the forward end of the lever U is provided with a friction roller U² engaging a fork or a bearing Q' arranged on the slide Q. The rear end of the shaft U is provided with a friction roller U³ engaging a cam groove V' in a cam plate V adjustably fastened to a bracket V² attached to the table A³. Bolts V³ screw in the bracket V² and extend through elongated openings V⁴ formed in the cam plate V so that when the said bolts V³ are loosened the cam plate V can be shifted forward or backward to a desired position and then fastened in place by screwing up the bolts V³. Now when the slide R is moved forward on the operator turning the hand wheel T³, as previously explained, then the lever U is carried along with the said guideway R and in doing so the friction roller U³ travels in the cam groove V' and consequently a swinging motion is given to the lever U so as to slide the slide Q toward the longitudinal center of the machine, it being understood that during this transverse sliding of the slide Q the latter is moved bodily forward with the slide R so that the peripheral face of the cutter head G is finally moved into engagement with the central portion of the outer face of the wheel D, as will be readily understood by reference to Fig. 5. As the cutter head G is continually driven it now faces the outer face of the wheel D and when this has been done the operator turns the hand wheel T³ in the reverse direction so that the slide R is moved to the right and in doing so the lever U is caused to swing back to its former position thus moving the slide Q rearwardly on its guideway R'. By adjusting the plate P on the slide Q, as previously explained, the peripheral cutting edge of the cutter head G can be set at any desired angle to the face of the wheel D so as to face the wheel either straight or in concave or convex shape, as desired, to produce a dish effect. The movement of the slide R to the left is limited by a regulating screw rod W screwing in a nut R² secured to or forming part of the longitudinal slide R, and the said screw rod W is adapted to abut against a stop W' attached to or forming part of the bracket V² previously mentioned. The outer end of the screw rod W is provided with a hand wheel W² to permit the operator to turn the screw rod W so as to limit the forward movement of the slide R with a view to prevent the cutter head G from cutting too deep into the face of the wheel D.

The operation is as follows: The wheel D to be bored and faced on both sides is first placed in position on the face plate C so that the rim D³ rests against the faces C³ of the jaws C² and the clamping blocks C⁷ clamp the wheel in place. The operator now turns the hand wheel N⁵ to advance the slide or carriage N so that the boring tool or cutter E cuts the central hole of the wheel to the desired size and the facing tool E' faces the portion of the outer face of the wheel adjacent the bored hole, and when this has been done the operator turns the hand wheel N⁵ in a reverse direction to retract the slide or carriage N to rearmost position, that is, until the carriage N comes to rest against the stop N⁶. The operator now unscrews the screw T⁴ to unlock the shaft T² to permit the operator to turn the hand wheel T³ so that a forward sliding movement is given to the carriage or slide R and at the same time a transverse sliding movement is given to the slide or carriage Q to move the same inward toward the longitudinal center of the machine with a view to move the peripheral cutting edge of the cutter head G in engagement with the central portion of the outer face of the wheel D to be faced or trimmed. The operator turns the hand wheel T³ until the screw rod W abuts against the stop W' (see Fig. 5) so as to provide a facing of the desired depth and then the hand wheel T³ is turned in an opposite direction to return the carriage or slide R to its forward position and with it the cutter head G. The operator now turns one of the screw rods J to move the jaws C² of the face plate C outward thus unclamping the wheel D to allow removal of the same. The auxiliary central face plate K is now placed in position on the small end of the spindle B (see Fig. 6) and then the wheel D is placed in position with its previously faced central portion resting against the auxiliary face plate K, and then one of the screw rods J is turned so as to move the jaws C² inward to reëngage the blocks C⁷ with the peripheral face of the rim D³ to clamp the wheel in place on the face plate. It will be noticed by reference to Fig. 6 that the rim D³ is out of contact with the faces C³ of the jaws C² and the previously faced portion of the wheel D rests against the auxiliary face plate K so as to hold the wheel in true position irrespective of any irregularities that may exist in the rim D³. The operator now again turns the hand wheel T³ so as to move the carriage or slide R forward with a view to engage the peripheral face of the cutter head G with the central portion of the now outer face of the wheel D to face the same to the desired depth, that is, until the screw rod W abuts against the stop W'. When this has been done the operator turns the hand wheel T³ in the opposite direction to return the carriage or slide R and with it the cutter head G to its forward dormant position as shown in Fig. 4 so that the cutter head G is out of the path of the boring spindle F and sufficient room is had for conveniently removing the wheel D from the face plates C and K. As soon as the cutter head G has been returned to its normal dormant position the operator locks the shaft T² against turning by screwing up the set screw T⁴. Another wheel is now placed in position on the face plate C and then the above-described operation is repeated, that is, the wheel is first bored by the boring tool E and faced adjacent the hole by the facing tool E', and then the spindle F is returned to dormant position and the cutter head G is advanced, as above explained, to face the central portion of the wheel.

It is understood that by facing the portion immediately adjacent the central hole bored in the wheel D by the use of the facing tool E' a smooth entrance to the hole is had and chipping is prevented during the subsequent facing operation by the cutter head G. It is also understood that by mounting the guideway O in the manner described a cylindrical or a conical hole can be bored in the wheel, and by adjusting the carriage or slide L in a transverse direction on turning the hand wheel L⁴ a hole of larger or smaller diameter can be bored. It will further be noticed that on swinging the plate P carrying the bearings P' for the cutter head spindle G' the cutter head G can be adjusted so that its peripheral face cuts either straight on the face of the wheel or in a convex or concave fashion, as desired and according to the adjustment made.

Having thus described my invention, I claim as new and desire to secure by Letters Patent:

1. A machine of the class described, comprising a revoluble face plate provided with adjustable jaws adapted to engage the rim of a wheel to be bored and faced and to hold the rim centrally on the face plate, means for moving the jaws simultaneously into and out of engagement with the rim, a retractable revoluble boring spindle, boring and facing tools attached to the said spindle for boring a hole centrally in the wheel and facing the wheel adjacent the hole, a revoluble cutter head adapted to engage the face of the wheel, a manually controlled means for bodily moving the said cutter head into active position relative to the face of the wheel and into inactive position relative to the face of the wheel and into inactive position and out of the path of the said boring spindle.

2. A machine of the class described, comprising a revoluble face plate provided with adjustable jaws for engagement with the rim of a wheel to be bored to hold the latter centrally on the face plate, means for moving the jaws simultaneously into and out of engagement with the rim, a guideway mounted to swing, manually-controlled means for imparting a swinging motion to the guideway to move the latter into position either parallel with the axis of the said face plate or at an angle thereto, a manually-controlled slide mounted on the said guideway, a boring spindle journaled in the said slide, a boring tool and a facing tool, both tools being attached to the said spindle and the said boring tool for boring a cylindrical or conical hole centrally in the wheel and the said facing tool facing the wheel adjacent the said hole.

3. A machine of the class described, comprising a revoluble face plate provided with adjustable jaws for engagement with the rim of a wheel to be bored to hold the latter centrally on the face plate, means for moving the jaws simultaneously into and out of engagement with the rim, a guideway mounted to swing, manually-controlled means for imparting a swinging motion to the guideway to move the latter into position either parallel with the axis of the said face plate or at an angle thereto, a manually-controlled slide mounted on the said guideway, a boring spindle journaled on the said slide, a boring tool and a facing tool, both attached to the said boring spindle, the said boring tool boring a cylindrical or conical hole centrally in the wheel, and the said facing tool facing the wheel adjacent the said hole, and a stop to limit the return sliding motion of the said slide.

4. A machine of the class described, comprising a revoluble face plate having means for holding a wheel to be faced, a cutter head adapted to engage the face of the wheel, a driven spindle on which the said cutter head is secured, and manually-controlled means carrying the said spindle and moving the said spindle and cutter head in a direction parallel to the axis of the face plate and then radially thereto to engage the cutter head with the face of the wheel.

5. A machine of the class described, comprising a revoluble face plate having means for holding a wheel to be faced, a fixed longitudinal guideway parallel to the axis of the said face plate, a longitudinal slide mounted to slide on the said longitudinal guideway and provided with a transverse guideway extending parallel to the face of the said face plate, a transverse slide mounted to slide on the said transverse guideway, a bearing held on the said transverse slide, a driven spindle journaled in the said bearing, a cutter head secured on the said spindle, and manually-controlled means imparting movement simultaneously to the said slides.

6. A machine of the class described, comprising a revoluble face plate having means for holding a wheel to be faced, a fixed longitudinal guideway parallel to the axis of the said face plate, a longitudinal slide mounted to slide on the said longitudinal guideway and provided with a transverse guideway extending parallel to the face of the said face plate, a transverse slide mounted to slide on the said transverse guideway, a bearing held on the said transverse slide, a driven spindle journaled in the said bearing, a cutter head secured on the said spindle, a lever fulcrumed on the said longitudinal slide and connected at one end with the said transverse slide, a fixed cam engaged by the other end of the said lever, and manually-controlled means connected with the said longitudinal slide to impart movement thereto.

7. A machine of the class described, comprising a revoluble face plate having means for holding a wheel to be faced, a fixed longitudinal guideway parallel to the axis of the said face plate, a longitudinal slide mounted to slide on the said longitudinal guideway and provided with a transverse guideway extending parallel to the face of the said face plate, a transverse slide mounted to slide on the said transverse guideway, a bearing held on the said transverse slide, a driven spindle journaled in the said bearing, a cutter head secured to the said spindle, a lever fulcrumed on the said longitudinal slide and connected at one end with the said transverse slide, a fixed cam engaged by the other end of the said lever, a rack on the said longitudinal slide, a gear wheel in mesh with the said rack, and a manually-controlled shaft journaled in fixed bearings and carrying the said gear wheel.

8. A machine of the class described, comprising a revoluble face plate provided with means for holding a wheel to be faced, a fixed longitudinal guideway parallel to the axis of the said face plate, a longitudinal slide mounted to slide on the said longitudinal guideway and provided with a transverse guideway extending parallel to the face of the said face plate, a transverse slide mounted to slide on the said transverse guideway, a bearing held on the said transverse slide, a driven spindle journaled in the said bearing, a cutter head secured on the said spindle, manually controlled means imparting movement simultaneously to the said slides, and an adjustable stopping device limiting the forward sliding movement of the said longitudinal slide.

9. A machine of the class described, comprising a revoluble face plate provided with means for holding a wheel to be faced, a fixed longitudinal guideway parallel to the axis of the said face plate, a longitudinal slide mounted to slide on the said longitudinal guideway and provided with a transverse guideway extending parallel to the face of the said face plate, a transverse slide mounted to slide on the said transverse guideway, a bearing pivoted on the said transverse slide and having slotted arms, bolts passing through the said slotted arms and screwing in the said transverse slide to fasten the bearing in the adjusted position, a driven spindle journaled in the said bearing, a cutter head secured on the said spindle, manually-controlled means to move the said longitudinal slide forward and backward, and means connected with the said transverse slide and controlled by the movement of the said longitudinal slide to move the said transverse slide inward or outward on its guideway.

10. A machine of the class described, comprising a main face plate having holding means adapted to engage the rim of a wheel to be faced, a revoluble cutter head, means for advancing and retracting it to face the central portions of the wheel, and an auxiliary face plate arrangeable to engage the said portion of the wheel whereby the middle portion of the wheel may be faced on one side and then reversed, and the faced portion supported by the auxiliary face plate while the opposite side is being faced.

11. A machine of the class described, comprising a main face plate having adjustable jaws adapted to engage the rim of a wheel to be faced at the central portion of both faces, means for adjusting the said jaws, a spindle carrying the face plate and having a hollow end, a revoluble cutter head for facing the central portions, and an auxiliary central face plate on which may rest the faced portion of one face of the wheel to hold the latter true relative to the cutter head and independent of the jaws, the said central face plate having a stud removably fitting into the hollow end of the said spindle.

12. A machine of the class described, comprising a main face plate having radially adjustable jaws, each jaw having a face for the side of the rim of a wheel to rest on, each jaw having on its outer end a flange, a clamping block on the said flange for engagement with the peripheral face of the wheel to hold the latter in position on the face plate, means for adjusting the jaws radially on the face plate, and an auxiliary face plate centrally on the said main face plate and adapted to engage the faced central portion of the wheel, the said auxiliary face plate having its face in a plane in advance of the plane in which the said jaw faces are located.

13. A machine of the class described, comprising a main face plate having radially adjustable jaws, each jaw having a face for the side of the rim of a wheel to rest on, each jaw having on its outer end a flange, means for adjusting the jaws radially on the said face plate, a clamping block on the said flange for engagement with the peripheral face of the wheel to hold the latter in position on the face plate, a spindle carrying the said main face plate and having a hollow end, and an auxiliary central face plate adapted to engage a faced central portion of the wheel, the said auxiliary face plate having a central stem fitting the said hollow spindle end and the surface of the auxiliary face plate lying in a plane in advance of the plane in which the said jaw faces are located.

14. A machine of the class described, comprising a main frame, a face plate adapted to carry a wheel to be bored and faced, the face plate having a spindle journaled on the said frame, a driven shaft journaled on the said main frame and geared with the said spindle, a fast pulley secured on the said driven shaft, loose pulleys on opposite sides of the said fast pulley, belts driven at different speeds and normally engaging the said loose pulleys, separate belt-shifting devices for the said belts to shift either belt from its loose pulley onto the said fast pulley and back to the loose pulley, to rotate the fast pulley at either a high or a low rate of speed, a revoluble retractable boring spindle provided with a boring tool for boring a hole centrally in the wheel at the time the face plate and with it the wheel is revolved at a high rate of speed, means for advancing and retracting the said boring spindle, a revoluble cutter head and means for advancing and retracting it to face the central portions of the wheel at the time the said face plate and the wheel are driven at a low rate of speed.

15. A machine of the class described, comprising facing means for facing a wheel at the central portions of the sides of the wheel, supporting means for supporting the wheel at the peripheral face of its rim, truing means for the side of the rim to rest on during the time of facing one side of the wheel by the said facing means, and auxiliary truing means for the previously faced portion to rest on during the facing of the other side of the wheel by the said facing means.

16. A machine of the class described, comprising facing means for facing a wheel at the central portions of the sides of the wheel, supporting means for supporting the wheel at the peripheral face of the rim of the wheel, and a rest for the fixed central portion of one side of the wheel to rest against while facing the central portion of the other side of the wheel by the said facing means.

In testimony whereof I have signed my name to this specification in the presence of two subscribing witnesses.

GEO. A. ENSIGN.

Witnesses:
R. CARRY MAY,
GERALD R. DE VEAUX.